United States Patent [19]

Angner et al.

[11] 4,055,731
[45] Oct. 25, 1977

[54] KEY TELEPHONE LAMP CONTROL CIRCUIT

[75] Inventors: Ronald Joseph Angner, Freehold; James Volney Lacy, Red Bank, both of N.J.

[73] Assignee: Bell Telephone Laboratories, Incorporated, Murray Hill, N.J.

[21] Appl. No.: 708,846

[22] Filed: July 28, 1976

[51] Int. Cl.² ............................................. H04M 1/72
[52] U.S. Cl. ................................. 179/99; 179/84 L
[58] Field of Search ................... 179/81 C, 84 L, 99; 315/200 A

[56] References Cited

U.S. PATENT DOCUMENTS

| | | | |
|---|---|---|---|
| 3,766,325 | 10/1973 | Hatfield et al. | 179/99 |
| 3,916,117 | 10/1975 | Matheny | 179/99 |
| 3,952,169 | 4/1976 | Vincent | 179/99 |
| 3,953,683 | 4/1976 | Gabrielson | 179/99 |
| 3,963,957 | 6/1976 | Knollman | 179/99 |

*Primary Examiner*—Kathleen H. Claffy
*Assistant Examiner*—Randall P. Myers
*Attorney, Agent, or Firm*—David H. Tannenbaum

[57] ABSTRACT

There is disclosed a circuit for providing various lamp signals to a line lamp of a key telephone station. The circuit is arranged with a single ac switch or triac for each line circuit. The triac is driven at the desired rate by a circuit which generates a series of phase-shifted digital zero crossing signals having the desired duty cycle rate. Advantage is taken of the fact that the triac only requires energization at the zero crossing of the ac signal.

2 Claims, 5 Drawing Figures

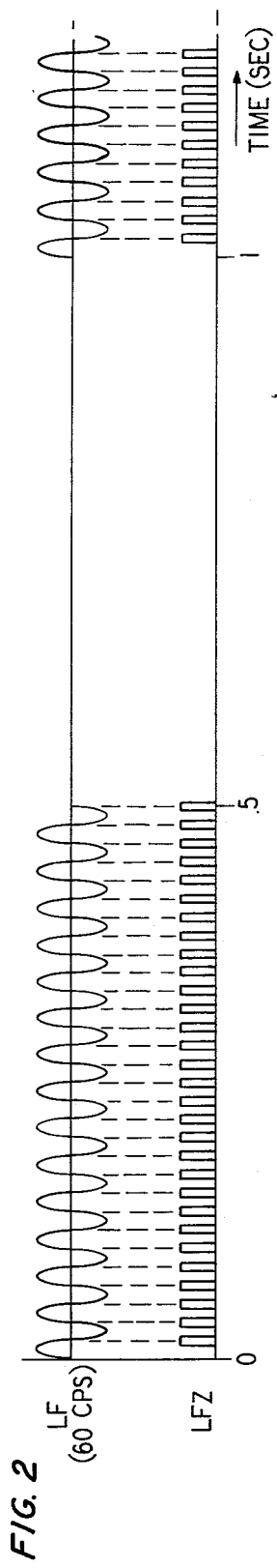
FIG. 2
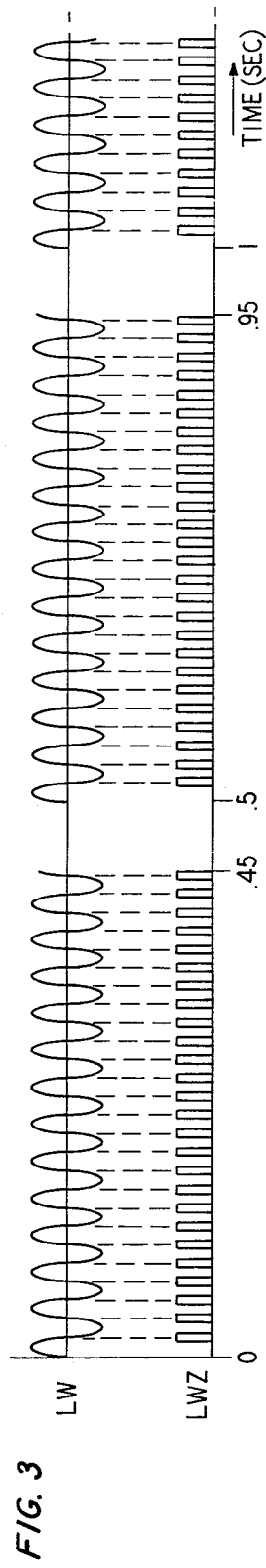
FIG. 3
| COMPONENT | VALUE |
|---|---|
| IR8 | 71.5Ω |
| IR6 | 909Ω |
| IR5 | 825Ω |
| IZ2 | 60-70V |
| IV2 | 50V bd 1.3a CONT |
FIG. 4

KEY TELEPHONE LAMP CONTROL CIRCUIT

FIELD OF THE INVENTION

This invention relates to key telephone systems in general and to lamp control circuitry in particular.

BACKGROUND OF THE INVENTION

One of the attributes of a key telephone system is that the line circuit is arranged to provide lamp signals indicative of the status of the associated stations. These lamp signals are ac signals having various distinctive duty cycles. The lamp wink signal used for the hold state and the lamp flash signal used for the ringing state are examples of the different signals provided. At present an interrupter circuit common to all of the line circuits provides the proper voltage signals, and relay contacts in each of the line circuits extend the commonly generated voltage signals to the associated lamp.

In the absence of relay contacts in the line circuit, as for example, when the line circuit is designed using solid state devices, provision must be made to extend the ac lamp signals to the associated stations. One possible solution to the problem would be to internally generate the lamp signals using dc signals and to apply the generated signals to the lamp. This approach, while solving the problem of switching ac signals, has the major disadvantage that the signals generated at each line circuit would be out of sync with each other and thus when a station is served from more than one line circuit the lamps associated with each line circuit could pulsate out of phase with each other thereby creating a highly undesirable situation.

Another replacement for the relay contact for switching ac power is the ac switch or triac. Typically, such a triac would be connected into the circuit in much the same manner as would the relay contact and the triac would then be operated by a control signal. Under such a condition there would be required a single triac for each of the various duty cycles.

Thus, it is desired to arrange a lamp control circuit capable of selectably providing a number of different signal rates to one or more lamps, all under control of a digital signal corresponding to the desired rate.

SUMMARY OF THE INVENTION

We have solved the problem of reducing the number of triacs necessary to provide different lamp flash rates to one or more lamps while retaining synchronization by recognizing that a triac once turned on only need be reenergized by a control pulse near the zero crossing point of the ac input signal. Thus, we have an embodiment where an ac signal of a given frequency is mechanically interrupted to provide several distinct signals each consisting of the ac frequency broken into a particular duty cycle. A series of discrete control pulses are then generated for each such distinct signal, each such pulse being phase shifted enough to provide control for a single triac during the zero crossing of the ac control signal.

Accordingly, it is one main feature of our invention that a single triac is used to provide a plurality of signals to one or more lamps all under digital control.

BRIEF DESCRIPTION OF THE DRAWING

The principles of our invention as well as additional objects, advantages and features thereof will be more fully appreciated from the illustrative embodiment shown in the drawing, in which:

FIGS. 2 and 3 show the timing relationships between the signals;

FIG. 4 shows a table of typical component values; and

DETAILED DESCRIPTION

Figure 5:
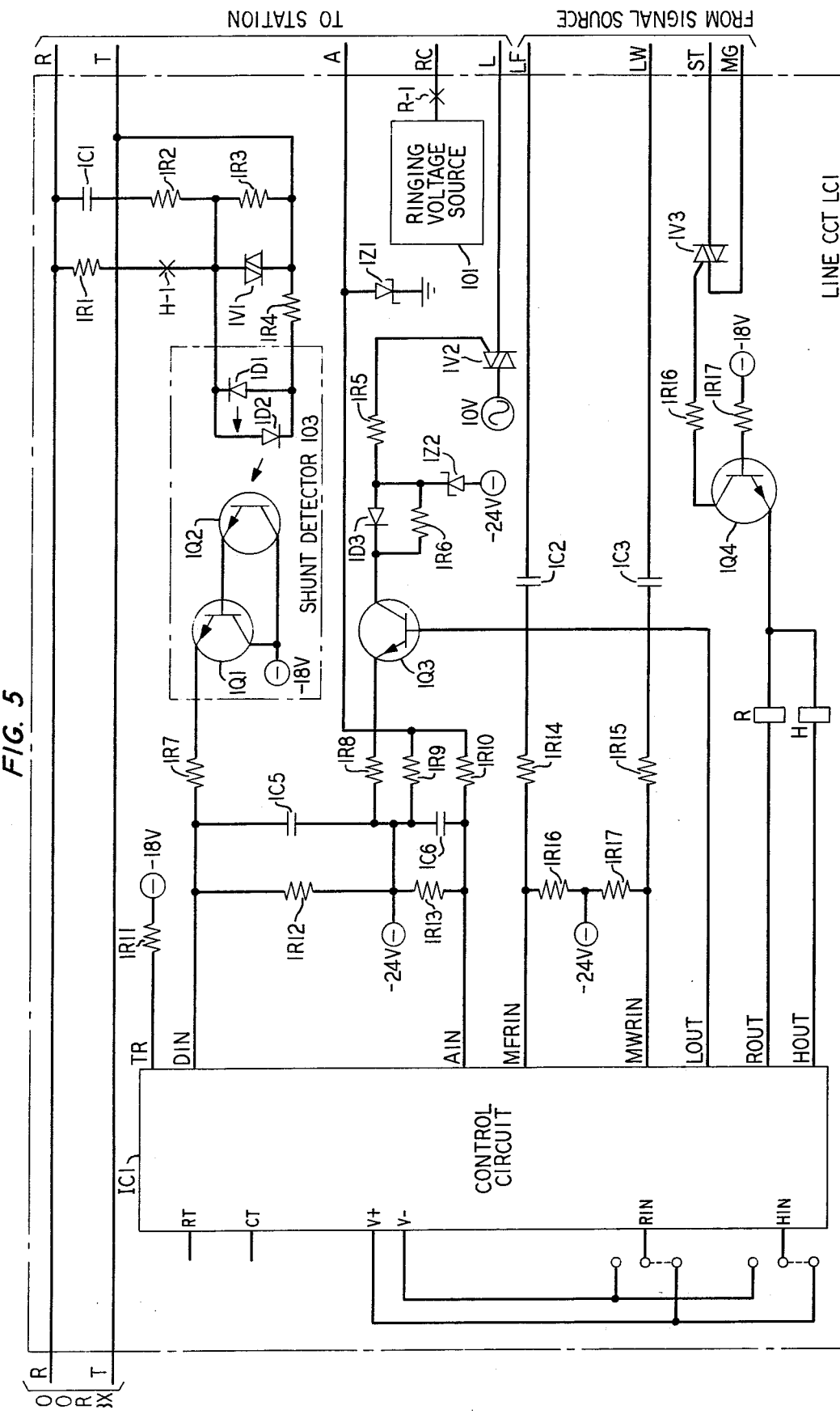
FIG. 5 shows our lamp control circuit in a key telephone system.

Before beginning the detailed description of our lamp control circuit, it should be noted that a typical application for the control circuit would be in a key telephone system line circuit, such as line circuit LC1 shown in FIG. 5, where lamp signals are extended via lead L to one or more connected telephone stations for the purpose of informing a subscriber thereat as to the status of the associated telephone line. The details of control circuit IC1 as well as the operation of line circuit LC1 are disclosed in a copending U.S. patent application, Ser. No. 708,857, filed July 28, 1976, in the name of Angner-Blount-Lacy. The details of the Angner-Blount-Lacy application will not be repeated herein but is incorporated by reference.

It should be noted that as shown in FIG. 5 lamp flash signals are communicated to line circuit LC1 from a mechanical interrupter (not shown) over lead LF and line wink signals are provided to line circuit LC1 over lead LW from the mechanical interrupter. These signals are provided in the well-known manner such that each consists of an ac frequency signal, which is typically 60 cycles, broken into a particular duty cycle representative of the distinct rate. In the case of lamp flash signals, the duty cycle is nominally half-second on and half-second off, while in the case of the lamp wink signals, the duty cycle is nominally 450 ms on and 50 ms off. These duty cycles are shown in FIGS. 2 and 3.

Figure 1:
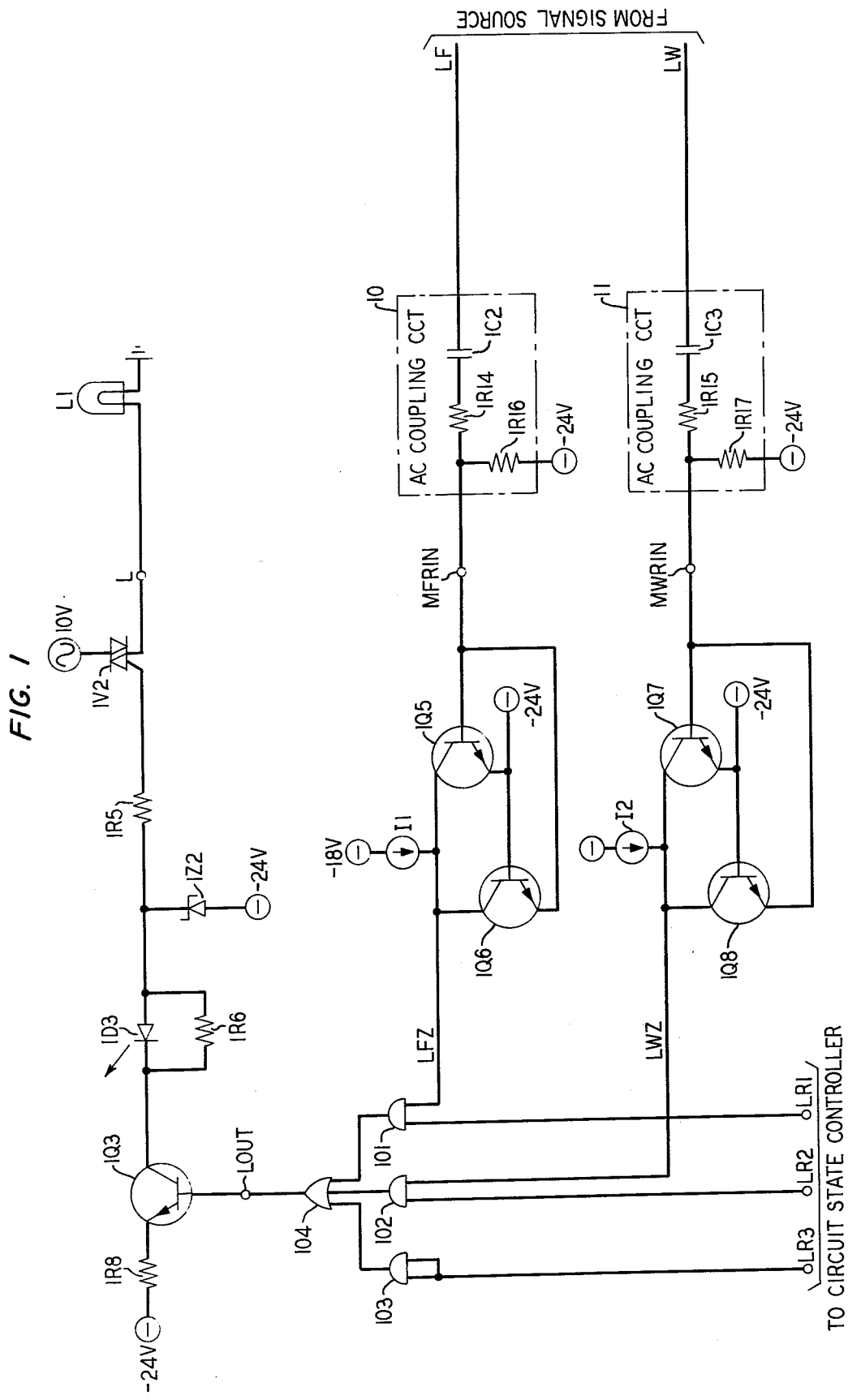
FIG. 1 shows a schematic diagram of our lamp control circuit.

Turning now to FIG. 1, the LF and LW dectector circuits are identical; the following circuit description for the LF detector also applies to the LW detector. Capacitor 1C2 and resistor 1R14 couple the LF input to the transistor detector input. One function of the capacitor is to block DC because the detector circuit is referenced to B battery (−24 VDC). Any ac signal present at the LF input is coupled to the base of 1Q5 which operates in the common emitter mode and the emitter of 1Q6 which operates in the common base mode. If the peak voltage across 1R16 is of sufficient amplitude, it will cause 1Q5 to turn on during positive peaks and 1Q6 to turn on during negative peaks. The collectors of 1Q5 and 1Q6 are normally pulled high by a current source; LFZ is pulled low by either transistor. Resistor 1R16 sets the sensitivity of the detector by virtue of the divider action of the impedance of 1C2 and 1R14 in series and the resistance of 1R16, which attenuates any ac signals which may be present across the LF and −24 VDC inputs to the line circuit. The detector will not respond to sinusoidal 60 hertz signals up to 2.0 volts RMS or to step changes in voltage up to 2.0 volts across the LF and −24 VDC inputs, which minimize false lamp indication due to ripple on the B battery supply and/or noise picked up by the LF lead. A second function of capacitor 1C2 is to phase shift the signal at the input to the transistor pair relative to the 60 hertz signal at the LF input so that the zero crossings of the voltage across resistor 1R16 are phase advanced nominally 68° with respect to the input signal to insure that LFZ will be low during the portion of the ac cycle within ± 30° of the zero crossings under worst case conditions with minimum ac supply voltage (8.5 volts RMS). These phase relationships are important for proper operation of the lamp switch as described below. The pertinent ac waveforms are shown in FIGS. 2 and 3.

Continuing in FIG. 1, signal LWZ is generated in the same manner as is signal LFZ, except that it has a duty cycle of 450 ms on and 50 ms off. The LWZ signal is similarly phase shifted as shown in FIG. 3 so that the on portion of each pulse coincides with the zero crossing points of the LW input signal. As shown in FIG. 1, the LWZ signal as well as the LFZ signal are each provided to one input of AND gates 102 and 101 respectively. The second input of each AND gate is shown connected to a terminal, such as terminal LR1, which terminal serves to selectively control the enabling of one of the various types of signals. Thus, when a high is provided to terminal LR1 the output of gate 101 follows exactly the digital signal on lead LFZ, which signal is provided to one input of OR gate 104. The output of OR gate 104 thereupon provides the selected digital pulse to the base of transistor 1Q3. In the same manner if a high is provided on input terminal LR2, the base of transistor 1Q3 would receive digital pulses having a duty cycle of LWZ while if a high were to be provided on terminal LR3 AND gate 103 would be on with a continuous duty cycle, thereby turning transistor 1Q3 on continuously.

Under control of OR gate 104 a current signal is provided to triac 1V2 turning on that triac, thereby providing 10 volts ac on lead L to lamp L1. The 10 volt ac source has the same frequency and phase as does the ac frequency which was mechanically interrupted to provide the LF and LW lamp flash and lamp wink signals. Thus at the zero crossing of each cycle of the 10 volt ac voltage, a digital pulse will occur if the lamp is to continue lighted at that point and thus the signal on the L-lead will have the same duty cycle as the selected digital output of gates 101, 102 or 103 except that the signal will be an ac voltage signal and not a dc pulsed signal.

As shown in FIG. 1, resistor 1R8 is selected to set the current of the current source transistor 1Q3 and resistor 1R5 is selected to limit the power dissipation in transistor 1Q3 and also to protect against voltage surges on the line. Zener diode 1Z2 is selected also to protect against voltage surges on the line while resistor 1R6 continues current flow in the event light emitting diode 1D3 fails in the open mode.

CONCLUSION

While three AND gates have been shown for controlling a continuous signal or one of two other signals, any number of such gates and signals can be used for control purposes providing only that the input is digitized and phase shifted so that the digital output is provided to the control triac during the zero crossing of the control signal on the triac. The triac should be selected with a current carrying capacity equal to the number of lamps which are to be controlled and having a voltage breakdown value high enough to withstand the peak ac supply voltage.

What is claimed is:

1. A circuit for providing a plurality of different ac voltage lamp signals to one or more lamps, each having a different duty cycle, said circuit comprising:

means for providing ac voltage signals to a lamp lead extending from said circuit, said means including a solid state ac switch having a power input terminal connected to a source of continuous ac voltage signals having a certain frequency and a certain phase, a power output terminal connected to said lamp lead, and a gate lead;

means for receiving first ac voltage signals having a first duty cycle at said certain phase, means for generating from received first ac voltage signals a first control signal consisting of a series of discrete pulses, each pulse being coincident with a zero crossing of said first ac voltage signal, said control signal having a duty cycle identical with said first duty cycle, said generating means including means for shifting the phase of received first ac voltage signals, means for applying said first control signal to said gate lead of said ac switch whereby said ac switch is enabled to supply said ac voltage signals to said lamp lead at said first duty cycle, means for receiving second ac voltage signals having a second duty cycle at said certain phase, means for generating from received second ac voltage signals a second control signal consisting of a series of discrete pulses, each pulse being coincident with a zero crossing of said second ac voltage signals, said control signal having a duty cycle identical with said second duty cycle, means for applying said second control signal to said gate lead of said ac switch whereby said ac switch is enabled to supply said ac voltage signals to said lamp lead at said second duty cycle, and means for selectively enabling said first and said second control signal applying means.

2. A line circuit for use in a key telephone system where a plurality of different ac lamp signals, each having a different duty cycle indicative of a particular circuit state, are provided to a connected telephone station, said line circuit having supplied thereto a source of ac signals having a continuous duty cycle and a first phase, and a source of ac signals having a first duty cycle and said first phase, the improvement comprising means, including a solid state ac switch, having a power input terminal connected to said continuous duty cycle ac signals, and having a power output terminal for providing said ac lamp signals to said connected telephone station, and having a gate terminal for controlling the passage of said ac signals through said ac switch, means for generating from said first duty cycle ac signals a first control signal consisting of a series of discrete pulses, each pulse being coincident with a zero crossing of said continuous duty cycle ac signal, said control signal having said first duty cycle, said generating means including means for shifting the phase of received first ac voltage signals, means for applying said first control signal to said gate lead of said ac switch whereby said ac switch is enabled to supply said continuous duty ac signals to said connected telephone station, said signals being provided through said ac switch at said first duty cycle, means for generating from said second duty cycle ac signals a second control signal consisting of a series of discrete pulses, each pulse being coincident with a zero crossing of said continuous duty cycle ac signal, said control signal having said second duty cycle, means for applying said second control signal to said gate lead of said ac switch whereby said ac switch is enabled to supply said continuous duty ac signals to said connected telephone station said signals being provided through said ac switch at said second duty cycle, and means for selectively enabling said first and said second control signal applying means.

* * * * *